Aug. 19, 1941.        W. F. PECK              2,252,726
APPARATUS FOR EXERCISING AND TRAINING EYES
Filed May 12, 1938      5 Sheets-Sheet 1
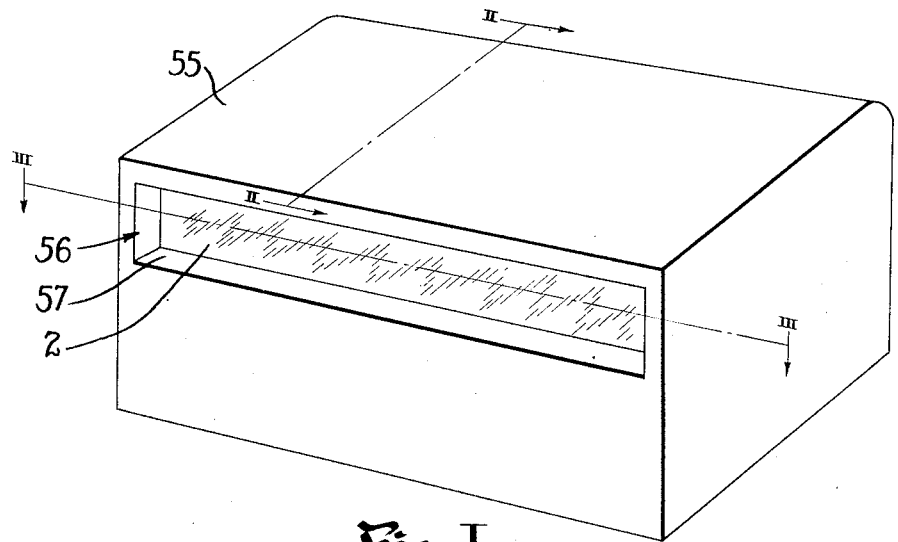
Fig. I
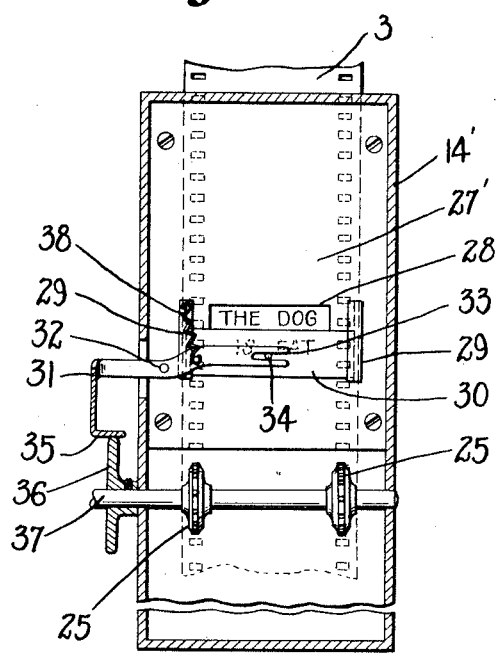
Fig. V
INVENTOR.
WILLIAM F. PECK
BY Harry H. Styll
ATTORNEY.

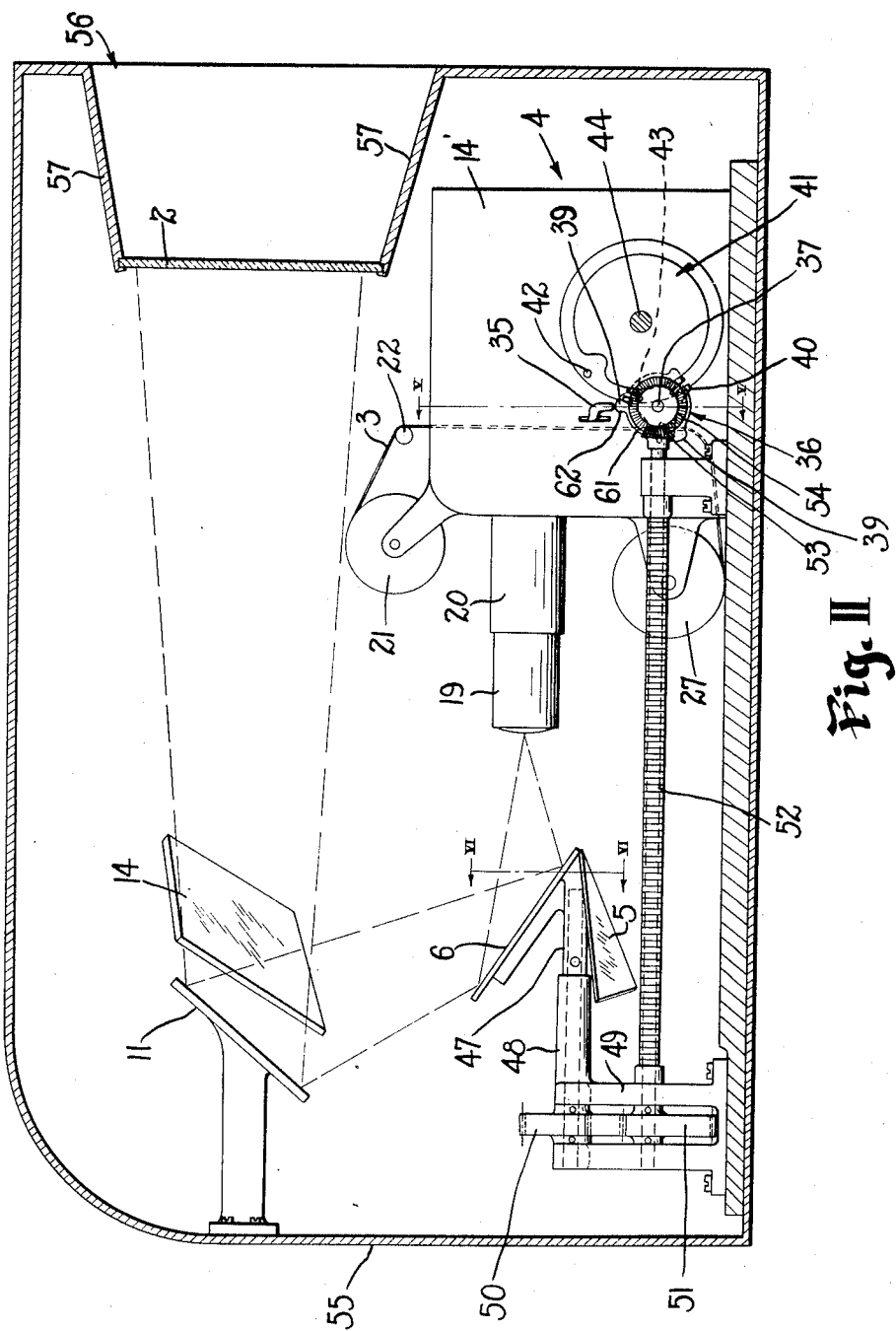

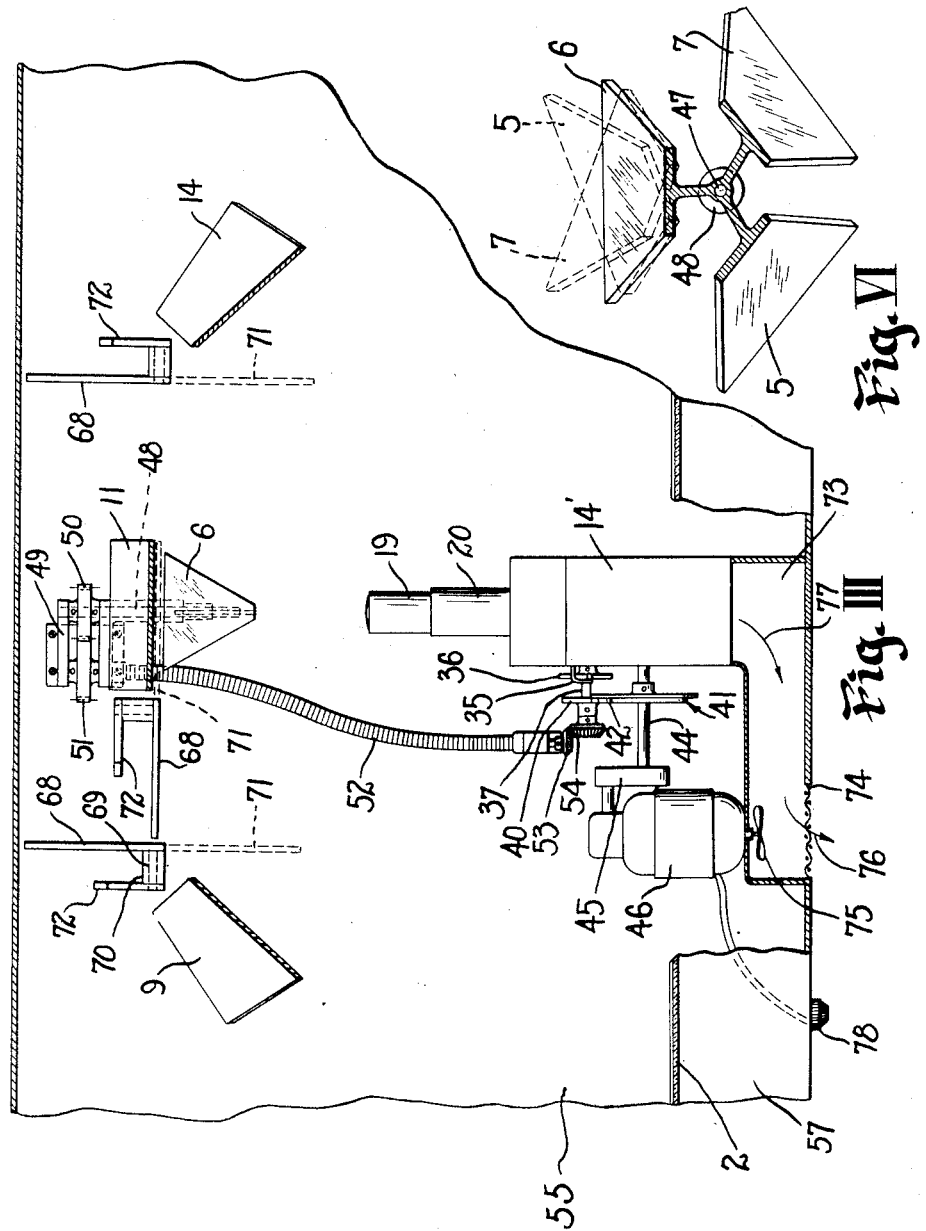

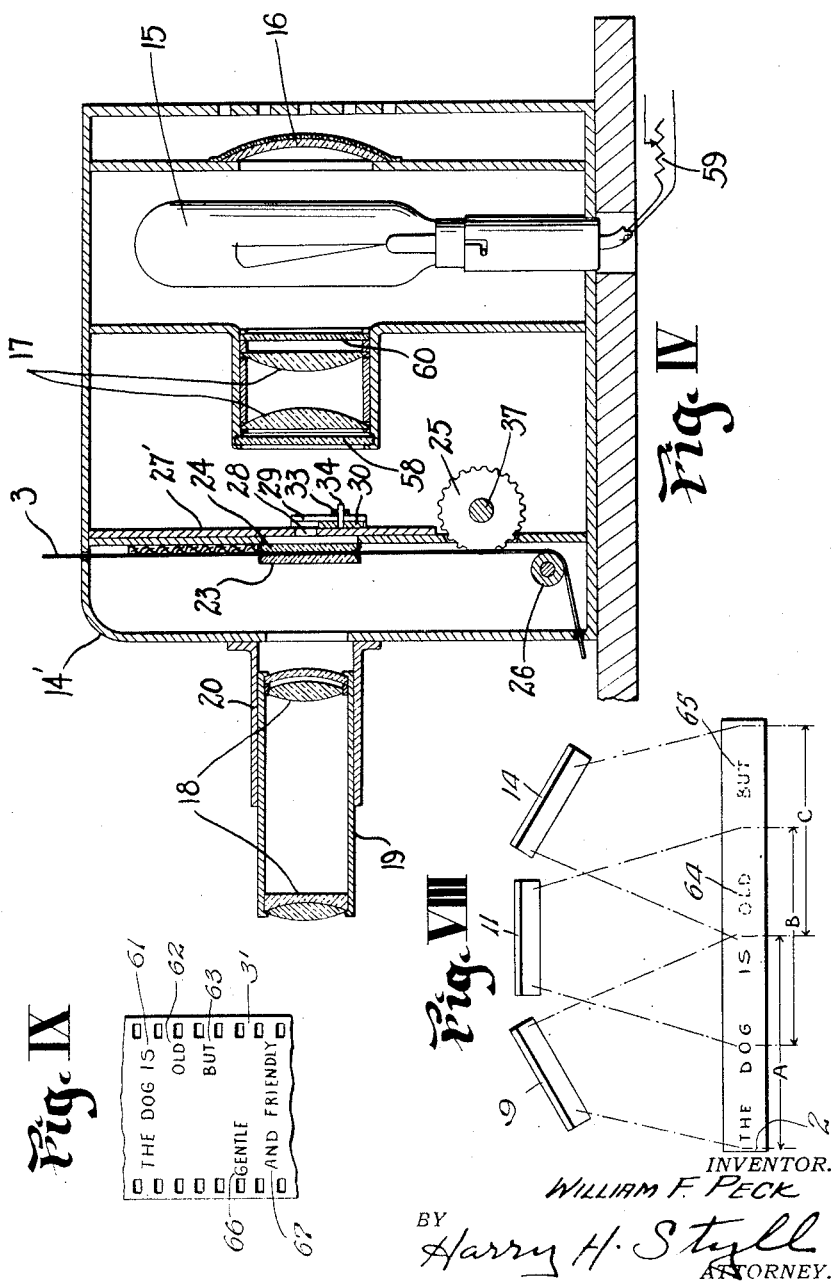

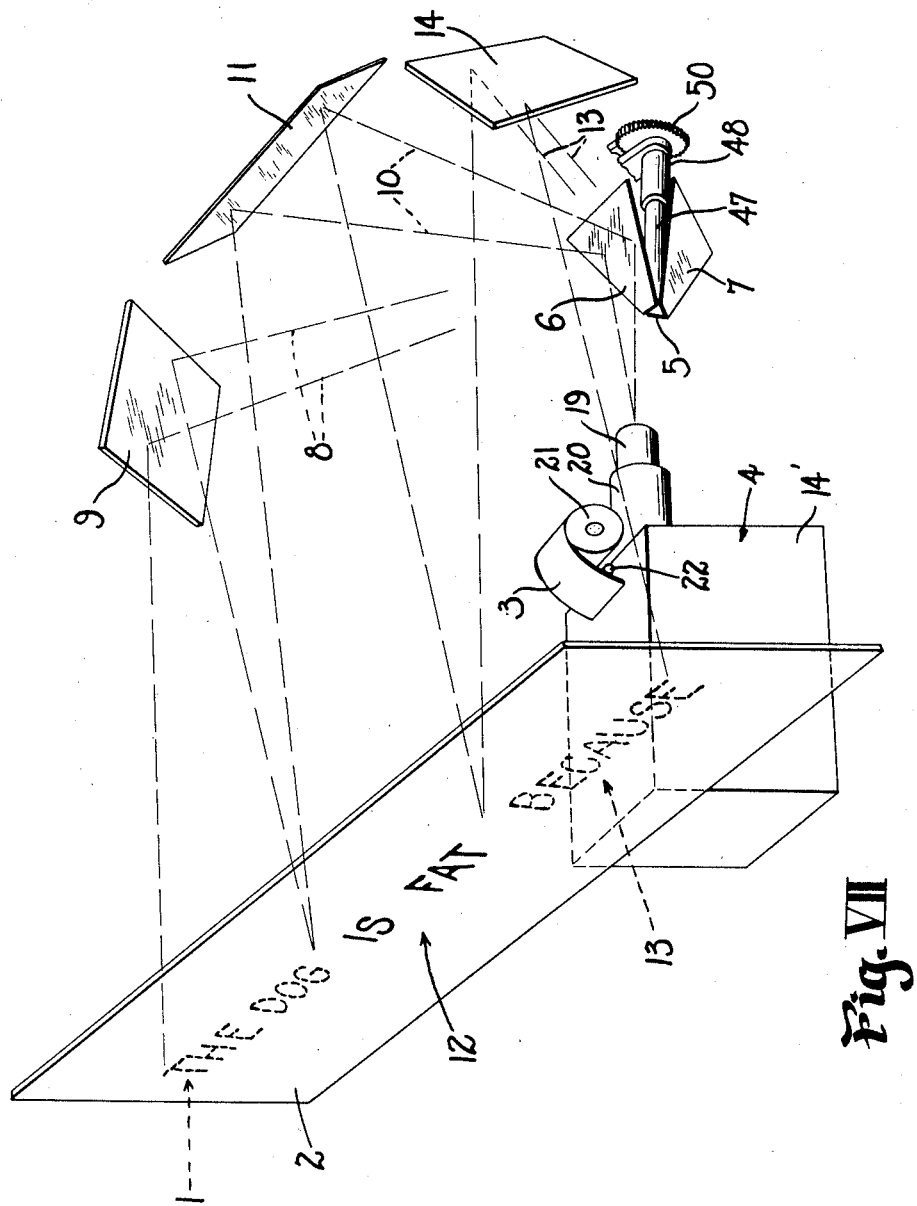

Patented Aug. 19, 1941

2,252,726

UNITED STATES PATENT OFFICE 2,252,726

APPARATUS FOR EXERCISING AND TRAINING EYES

William F. Peck, Kenmore, N. Y., assignor to American Optical Company, Southbridge, Mass., a voluntary association of Massachusetts Application May 12, 1938, Serial No. 207,527

4 Claims. (Cl. 35—35)

This invention relates to a novel apparatus for exhibiting reading indicia or symbols or groups of said indicia or symbols in progressive sequence in the direction of reading for exercising and training the eyes of individuals viewing said indicia or symbols.

One of the principal objects of the invention is to provide a novel apparatus for exhibiting fixation indicia or symbols in progressive sequence in the direction of reading, with none of the moving mechanical parts of said apparatus being visible during said exhibitions.

Another object of the invention is to provide a novel apparatus for training the reading habits of individuals wherein the said means bringing about such training may be viewed by a large or small number of individuals.

Another object is to provide a novel means for projecting fixation indicia or symbols in progressive sequence in the direction of reading wherein the necessity of wide angle projection will be eliminated.

Another object is to provide a projection apparatus to facilitate such training in reading habits wherein a compact film having the projection indicia or symbols thereon may be used and with which the span of projection may be controlled.

Another object is to provide a greatly simplified construction of apparatus for facilitating the exercising of eyes and training of reading habits.

Another object is to provide a simplified apparatus for accomplishing all of the objects and advantages of the device disclosed and claimed in Re. Patent No. 20,223, issued December 29, 1936.

Another object is to provide combined projection and reflection means for accomplishing the above results.

Other objects and advantages of the invention should become apparent from the following description taken in combination with the accompanying drawings and it will be apparent that many changes may be made in the details of construction and arrangement of parts shown and described, without departing from the spirit of the invention as expressed in the accompanying claims.

I, therefore, do not wish to be limited to the exact details of construction and arrangement of parts shown and described, as the preferred form only has been given by way of illustration.

Referring to the drawings:

Fig. I is a perspective view of the device embodying the invention;

Fig. II is an enlarged sectional view taken as on line II—II of Fig. I and looking in the direction of the arrows;

Fig. III is a fragmentary sectional view taken as on line III—III of Fig. I and looking in the direction indicated by the arrows;

Fig. IV is an enlarged sectional view of the projection apparatus;

Fig. V is a fragmentary slightly enlarged sectional view taken as on line V—V of Fig. II;

Fig. VI is an enlarged fragmentary sectional view taken as on line VI—VI of Fig. II and looking in the direction indicated by the arrows;

Fig. VII is a diagrammatic perspective view illustrating the function of the reflective system;

Fig. VIII is a diagrammatic view illustrating a modified arrangement whereby the length of the span of the projected indicia may be varied; and Fig. IX is a fragmentary face view of a film illustrating the amount and position of indicia which is to be projected at each framing of the projection device and by which the length of the recognition span of the projected indicia may be varied.

The apparatus shown is intended to be merely illustrative of the invention, inasmuch as there are various systems of projection to which the invention is adaptable. In the particular form of apparatus shown, the reading matter or symbols 1 are thrown upon a translucent screen 2 from behind, so that the individual may view said reading matter or indicia from the front of said device.

The reading matter or symbols which it is desired to be viewed are carried by a film 3 and, as shown in Fig. VII, are intermittently projected by a suitable projector 4 onto reflective means such as mirrors 5, 6 and 7. The first projection is illustrated by dash lines 8, to direct the projected rays of light onto an angled reflector 9 which, in turn, directs the said rays toward the translucent screen 2 and thereby projects the desired indicia or symbols on the left section of said screen.

The film 3 is then advanced an amount sufficient to bring the next desired reading matter or symbols in line with the projection system of the projector 4 and the mirror 6 is then simultaneously rotated into position to reflect the projected rays of light 10 onto another angled reflector 11 which directs the said projected rays toward the translucent screen 2 and thereby produces the next exhibited section of indicia 12 throughout the intermediate area of said translucent screen. It is to be understood that prior to the shifting of the film 3 and mirror 6, the first exposed section of reading matter or symbols is shut off. The film 3 is again moved by suitable mechanism, which will hereinafter be described in detail, an amount sufficient to bring the next desired reading matter or symbols in line with the projection system of the projector 4, and the mirror 7 is simultaneously rotated to a position to receive the projected light rays and direct the said rays as indicated at 13 toward another reflector 14 which directs the said rays toward the translucent screen and produces the next exhibited section of reading matter or symbols on the section or area of the translucent screen to the right side of said screen.

Continued operation of the projection apparatus and mirrors 5, 6 and 7 brings about a repetition of the said intermittently and progressively exhibited sections of reading matter or symbols.

The projection apparatus as illustrated in Figs. II, III, and IV comprises broadly a housing or casing 14' having a suitable source of illumination 15 therein. Internally of said housing and in the rear of said source of illumination there is provided a suitable parabolic reflector 16 for directing the major portion of the light toward the projection system. The projection system comprises a set of condensing lenses 17, spherical or cylindrical, and projection lenses 18. The said projection lenses are mounted in a tubular member 19, which is adjustably supported to slide longitudinally of a support 20 carried by the casing 14.

The film 3 is carried by a suitable film roll 21. The said film extends over a suitable roller 22 and thence inwardly of the casing 14' and between suitable supporting plates of glass or the like 23 and 24 inwardly of said casing and in line with the projected rays of light. The film progresses from said plates 23 and 24 downwardly into engagement with suitable sprocket wheels 25, over another roller 26 and thence on to a take-up reel 27.

The casing is provided with an inner partition 27' between the condensing lens system 17, and projection lenses 18, which is provided with a framing opening 28 in line with the projected rays of light.

The partition 27' is provided with guideways 29 adjacent the framing opening 28 in which a baffle plate 30 is slidably mounted. The said baffle plate 30 is supported to be moved into and out of alignment with the opening 28 and this movement is brought about by a rock lever 31 which is pivoted at 32 to the partition 27'. The said rock lever is provided adjacent its inner end with a slot 33 which engages a pin 34 carried by the baffle plate 30.

The opposite end 35 of said lever 31 engages an operating cam 36 carried by the shaft 37 on which the sprocket wheels 25 are mounted. A spring 38 normally urges the slotted end 33 of the lever in an up direction and thereby normally urges the baffle 30 to a position wherein it will overlie the opening 28. The cam 36 which, as shown in Fig. II, is provided with a plurality of risers 39, moves the end 35 upwardly against the resilient action of the spring 38. The cam 36 is intermittently rotated by means of a star wheel 40 mounted on the shaft 37. The said star wheel is intermittently rotated by a Geneva wheel 41 having a pin 42 which intermittently engages the slotted portions 43 of the star wheel 40. The Geneva wheel 41 is mounted on a shaft 44 which is continuously rotated through a reduction gear system 45 by a suitable motor 46. The speed of rotation and size of said wheel 41 is such as to produce the time intervals desired between said intermittent movements of the cam 36. As the cam 36 is rotated the risers 39 thereon intermittently engage and disengage the end 35 of the lever 31 and thereby intermittently move the baffle plate 30 into and out of alignment with the opening 28.

The mirrors 5, 6 and 7 are mounted on a shaft 47 mounted in a bearing 48 carried by a support 49. The said shaft 47 is rotated by means of a gear 50 which meshes with a gear 51 carried by a flexible shaft 52. The shaft 52 has a suitable gear 53 meshing with a suitable gear 54 carried by the shaft 37. It will be seen therefore that when the shaft 37 is intermittently rotated by the Geneva mechanism, the beveled gear 54 meshing with the beveled gear 53 will simultaneously rotate the shaft 52 and in turn rotate the mirrors 5, 6 and 7 carried by the shaft 47. The ratio of the gearing is such as to rotate the respective mirrors 5, 6 and 7 the desired amounts.

It will be noted that the mirror 5 is rotated to the position indicated in dash lines in Fig. VI. The position to which the mirror 6 is rotated is illustrated in full lines and the position to which the mirror 7 is rotated is indicated in dash lines.

The projector 4 and the various mirrors and operating mechanism are encased within a housing 55 having a window opening 56 in the front thereof with which the translucent screen 2 is aligned and supported by the inwardly extending walls 57.

The intensity of the illumination may be controlled by suitable filters or the like 58 or through the provision of a rheostat or the like 59, see Fig. IV.

A suitable heat screen or the like 60 having infra-red absorptive means such as ferrous iron or the like may be supported between the condensing lenses 17 and source of illumination 15 if desired, or one of the said condensing lenses 17 may be provided with such absorptive properties. This would prevent the film 3 from becoming overheated during the use of the device.

The operation of the device is substantially as follows:

A film 3 having the desired reading matter or fixation symbols thereon is placed in the projector. The source of illumination 15 is turned on and the projected indicia focused on the translucent screen 2. It is to be understood that the various mirrors are so located that there will be a fixed focus with all of said reflectors. The motor 46 is then turned on to cause the shaft 44 and Geneva wheel 41 to be continuously rotated. The intermittent engagement of the pin 42 with the star wheel 40 will intermittently rotate the shaft 37 together with the sprocket wheels 25, cam member 36 and gear 54.

Rotation of the shaft 37, therefore, together with the sprocket wheels 25, cam member 36 and beveled gear 54, causes the said film to be moved and the mirrors 5, 6 and 7 to be simultaneously rotated. The extent of such movement is such as to intermittently advance each section of reading matter or symbols on the film successively into alignment with the framing opening 28 and to simultaneously move the mirrors 5, 6 and 7 into alignment with the light rays projected by the projection lenses 18. Prior to this movement of the film and the mirrors 5, 6 and 7, as the case may be, the cam member 36 is so positioned as to allow the spring member 38 to move the baffle shutter or plate 30 over the opening 28. At the completion of each of said intermittent movements of the film 3 and mirrors 5, 6 and 7, the risers 39 engage the rock lever 31 and move the said baffle plate or shutter 30 clear of the opening 28. This causes the reading matter or fixation symbols aligned with the opening 28 to be projected on to the translucent screen 2. Continued operation of the device causes successive alignment of new indicia with the opening 28 and projection thereof onto the translucent screen 2. These projections occur from left to right on the screen in the direction of normal reading and thereby produce a line of reading matter correlated in reading context by intermittent exhibitions of selected groups of said indicia in the direction of reading. The first group of indicia appears on the left hand side of the screen. This group is in effect blanked out and the following set of indicia is next exposed or exhibited at the center of the screen, etc. These successive exhibitions occur in such a manner that the eyes are caused to move in step by step progression during said exhibitions with none of the moving parts of the device visible. The duration of blanking out depends upon the length of the dwell areas 61 on the cam member 36. These dwell areas are between the various risers 39 on said cam. It is to be noted that a sharp drop 62 is provided on the side of each of said risers 39 so that a quick closing of the opening 28 by the baffle plate 30 will occur at the completion of each successive exhibition.

The fixation indicia or symbols may be in the form of white letters on a black background or black letters on a white background, depending upon the nature of the film 3 which is used. The film may be in positive or negative form to produce this result. It is also to be understood that the fixation indicia or symbols may be of different colors on a dark background, or may be in the form of black letters or symbols on a different colored background. The color of said background or indicia may be controlled by suitable color screens which may be substituted for the filter 58 or used in combination therewith or a colored film may be used.

It is to be understood that the said translucent screen 2 may be omitted and the indicia may be projected onto a separate screen positioned at a considerable distance from the device, if desired.

Exercising treatment and reading training is brought about by setting the patient or patients before the translucent screen and having the patient or patients view said intermittently exhibited sections of indicia and read the context thereof or, if the patient cannot read, to view successively exhibited symbols which may have any character which may be identified by the patient.

During the intermittent exhibitions the eyes successively move from left to right simulating the movements thereof during reading and because of the fact that the indicia are intermittently exhibited and blanked out the patient is more or less induced to move his eyes progressively with the progressive movement of said intermittent exhibitions. Because of the fact that the progressively exhibited indicia are blanked out, the eyes will have no tendency to regress during said training. This, therefore, tends to overcome any regressive habit which the patient may have.

The exercising is directed to the muscular structure of the eyes through the intermittent movement of the eyes and tends to strengthen and innervate the same.

The device may be used with or without prisms before the eyes. The advantages of the use of prisms are clearly disclosed in Patent No. 2,110,344, issued March 8, 1938.

It is to be understood that all of the exercising treatments disclosed in the above patent may be accomplished with the device embodying the invention.

The use of different colored screens, such as red, green, yellow, etc., introduce different retinal stimulations which also cause different reactions of the eyes and thereby produce different treatments, all of which are known to the art.

In Fig. VIII there is diagrammatically illustrated a modified form of the device embodying the use of a projector 4 having a plurality of mirrors, such as illustrated in Fig. VII, together with a plurality of mirrors 9, 11 and 14 and a translucent screen 2. The device in this instance is so constructed that the span of projection as reflected by the reflectors 9, 11 and 14, as illustrated at A, B and C respectively, overlap each other. This provides means whereby a film 3', such as shown in Fig IX having a different number of word groups in each framing, as illustrated at 61, 62 and 63 may be used. It will be noted that when the first framing 61 is projected onto the screen 2 the full width of the projected span A is used. When the frame 62 is projected onto the screen 2 only the right end of the projected span B is used, as illustrated at 64. When the framing 63 is projected onto the screen 2, only the right end of the projected span C is used, as illustrated at 65. The number of words in each framing is thereby varied. This varying is so controlled, however, as to avoid having the indicia overlap each other during each intermittent exhibition or overlie the portion of the screen which a portion of the previously projected indicia occupied. This thereby causes the eye to advance in step by step progression, similar to the device previously described above, the only difference being that the text of the word groups of each exhibition may be controlled. It is obvious that if only one word, such as illustrated at 66, were projected to the left side of the projection span A, a group of words, such as illustrated at 67, could be projected on the projection span B. It being understood, as stated above, that the word groups could be so projected as to be in spaced progression in the direction of reading. By varying and controlling the lengths of the word groups at each framing of the intermittently advanced film and by having the spans of projection arranged, as illustrated in Fig. VIII, a different length or group of words or indicia may be intermittently projected on the screen 2. The spacing of the groups in each span of projection is controlled by the film as illustrated in Fig. IX. With this arrangement, it is possible to vary the amount of indicia exposed at each recognition span so that if the entire width of one span is not utilized during one exhibition of indicia, the unoccupied portion may be utilized during the next exhibition of indicia.

It is apparent from the above that films, such as illustrated at 3', having groups of indicia of different lengths thereon, may be used.

In Fig. III, there is diagrammatically illustrated at 68 a plurality of shutter members, each having a pivotal connection 69 to a suitable bearing 70 adjacent each of the reflectors 9, 11 and 14, and which may be moved as illustrated by the dotted lines 71 to a position intermediate the reflective means 5, 6 or 7, as the case may be, and the respective reflectors 9, 11 or 14. A suitable lever or other means 72 is provided for operating said shutter members separately. This arrangement provides means whereby the indicia projected onto the screen 2 by said reflectors may be blanked out.

It is to be understood that the shutter arrangement described above, is set forth only by way of illustration as to how the effectiveness of each of said reflectors may be separately controlled, any other suitable arrangement that will accomplish the same result may be used.

The housing 14' of the projector is connected with a chamber 73 having a screen-like wall 74. A fan 75 mounted on the motor 46 lies within said chamber 73 and is adapted to blow air outwardly of said chamber, as illustrated by the arrow 76, and simultaneously draw hot air outwardly of the housing 14', as illustrated by the arrow 77. This arrangement provides means for automatically reducing the temperature internally of the housing 14'.

The speed of the motor may be controlled through the use of a suitable rheostat 78 or by a governor or other means.

From the foregoing description, it will be seen that simple, efficient and economical means is provided for accomplishing all of the objects and advantages of the invention.

Having described my invention, I claim:

1. In a device of the character described the combination of a viewing screen and a projector for projecting indicia to be viewed on said viewing screen, said projector comprising means for producing a projected beam of light, a shutter member, means for intermittently moving said shutter member into and out of shunting relation with said projected beam of light, means for supporting and intermittently moving a film having indicia thereon which, when in cooperative relation with said projected beam of light, will produce fixation means to be viewed on said viewing screen and mechanical means interconnected with the means for moving said shutter and the means for intermittently moving said film for successively shunting the beam of light and intermittently moving said film and for permitting said beam of light to be projected through said film when the indicia to be projected is positioned in said beam of light.

2. In a device of the character described, a projector for use with a viewing screen, said projector comprising means for producing a projected beam of light, a shutter member supported for movement into and out of alignment with said beam of light, means for supporting a film having indicia thereon to be projected by said projected beam of light and mechanical means interconnected with the shutter and film supporting means for intermittently and cooperatively moving said shutter member and film, whereby the said shutter is moved into said beam of light to cut off said beam from said film and out of said beam of light to permit the passage of light to said film, successive portions of said film being presented to the said beam of light.

3. In a device of the character described, a projector for use with a viewing screen, said projector comprising means for producing a projected beam of light, a shutter member supported for movement into and out of alignment with said beam of light, means for supporting a film having indicia thereon to be projected by said projected beam of light and motion transfer means interconnected with the shutter and film supporting means for intermittently and cooperatively moving said shutter member and film, whereby the said shutter is moved into said beam of light to cut off said beam from said film and out of said beam of light to permit the passage of light to said film, successive portions of said film being presented to the said beam of light during the movement of the shutter member into and out of said beam of light.

4. In a device of the character described, a projector for use with a viewing screen, said projector comprising means for producing a projected beam of light, a shutter member supported for movement into and out of alignment with said beam of light, means for supporting a film having indicia thereon to be projected by said projected beam of light and motion transfer means interconnected with the shutter and film supporting means for intermittently and cooperatively moving said shutter member and film, whereby the shutter is moved into said beam of light to cut off said beam and out of said beam of light to permit the passage of light, successive portions of said film being presented to the said beam of light during the movement of the shutter member into and out of said beam of light.

WILLIAM F. PECK.